United States Patent [19]

Enzinna

[11] Patent Number: 5,347,841
[45] Date of Patent: Sep. 20, 1994

[54] SELF-TESTING TRANSDUCER CURCUIT

[75] Inventor: Donald J. Enzinna, Lockport, N.Y.

[73] Assignee: Kistler Instrument Corporation, Amherst, N.Y.

[21] Appl. No.: 944,319

[22] Filed: Sep. 14, 1992

[51] Int. Cl.$^5$ .............................................. G01P 21/00
[52] U.S. Cl. ...................................................... 73/1 D
[58] Field of Search ............ 73/1 D; 307/272.3, 296.1, 307/296.4, 515; 324/601

[56] References Cited

U.S. PATENT DOCUMENTS

| | | | |
|---|---|---|---|
| 3,618,358 | 11/1971 | Dendy et al. | 73/1 D |
| 4,890,270 | 12/1989 | Griffith | 368/113 |
| 4,934,564 | 6/1990 | Piatt | 222/14 |

FOREIGN PATENT DOCUMENTS 2239096  6/1991  United Kingdom ................. 73/1 D Primary Examiner—Hezron E. Williams
Assistant Examiner—Daniel S. Larkin
Attorney, Agent, or Firm—Barnes & Thornburg

[57] ABSTRACT

A transducer having a regulated power supply for the auxiliary circuits or additional stages using the available power in a transducer module. The voltage required for the regulator is less than lowest transducer circuit output signal as controlled by the output or driver stage. One auxiliary circuit is a self-testing circuit which is responsive to the power-up of the transducer for applying test signals to the transducer for a predetermined time. The tester would include an oscillator for generating test signals in response to a power-up and a disable circuit for disabling the oscillator after the predetermined time as determined by a count of the test signals.

26 Claims, 3 Drawing Sheets

SELF-TESTING TRANSDUCER CURCUIT

BACKGROUND AND FIELD OF THE INVENTION

The present invention relates generally to transducers and more specifically to an improved two wire transducer.

A transducer in a two wire system receives its power from the two wire system and transmits back a signal indicative of the physical parameter to be monitored. The power supply is at the remote location. The transducer module itself usually includes a transducer, an amplifier and a pair of terminals. The power is in the form of a DC current usually four milliamps, supplied over the pair of wires. The amplifier will bias its output to a DC potential which provides a supply of power for itself. With zero output voltage, there would be zero power available. Excess power not used by the amplifier is sunk to ground.

Typical prior art modules are illustrated in FIGS. 1 and 2 as including a transducer 10 connected to the pair of terminals 12 and 14 by a first impedance converter Q1 and an output driver or buffer. In FIG. 1, the output driver or current buffer is shown as a transistor Q2. In FIG. 2, the transistor Q2 is replaced by an operational amplifier A1. Bias control 16 has been added to control the output DC potential and hence provide a power supply for the device.

The demand exists for smart transducers or transducers which incorporate more system functions within the transducer module other than merely providing a signal on the output terminal 12. Kistler Instrument, Corporation, Assignee of the present patent, has heretofore used piezoelectric as the transducer 10 and has only been able to use a single stage amplifier. No other active devices or stages have been considered usable within the module to date.

Thus there exists the need to provide more stages in circuitry within the transducer module without degrading the signal quality.

Thus it is an object of the present invention to provide a smart transducer without increased size, power or wiring requirements.

Another object of the present invention is to provide a transducer module with an increased number of stages and circuitry without degrading the signal quality.

Still a further object of the present invention is to provide a piezoelectric transducer module operable in a two wire system, including additional stages and signal processing over that of the prior art.

These and other objects are achieved by providing a regulated power supply for the auxiliary circuits or stages using the available power in a transducer module. The regulated power supply may be a current source or current converted to a regulated voltage. The voltage required for the regulator is less than lowest transducer circuit output signal as controlled by the output or driver stage. The additional stages may be amplification or signal processing stages connected between the transducer and the output drive or buffer, and the auxiliary circuits provide other functions.

One auxiliary circuit is a self-testing circuit which is responsive to the power-up of the transducer for applying test signals to the transducer for a predetermined time. The tester would include an oscillator for generating test signals in response to a power-up and a disable circuit for disabling the oscillator after the predetermined time. This disabling is achieved by providing a reset signal to the oscillator after the expiration of the predetermined time as determined by a counter. The oscillator is maintained in the disabled state by a latch. Provisions also are provided to initialize a counter on a power-up.

Other objects, advantages and novel features of the present invention will become apparent from the following detailed description of the invention when considered in conjunction with the accompanying drawings.

BEST MODES FOR CARRYING OUT THE INVENTION

Figure 3:
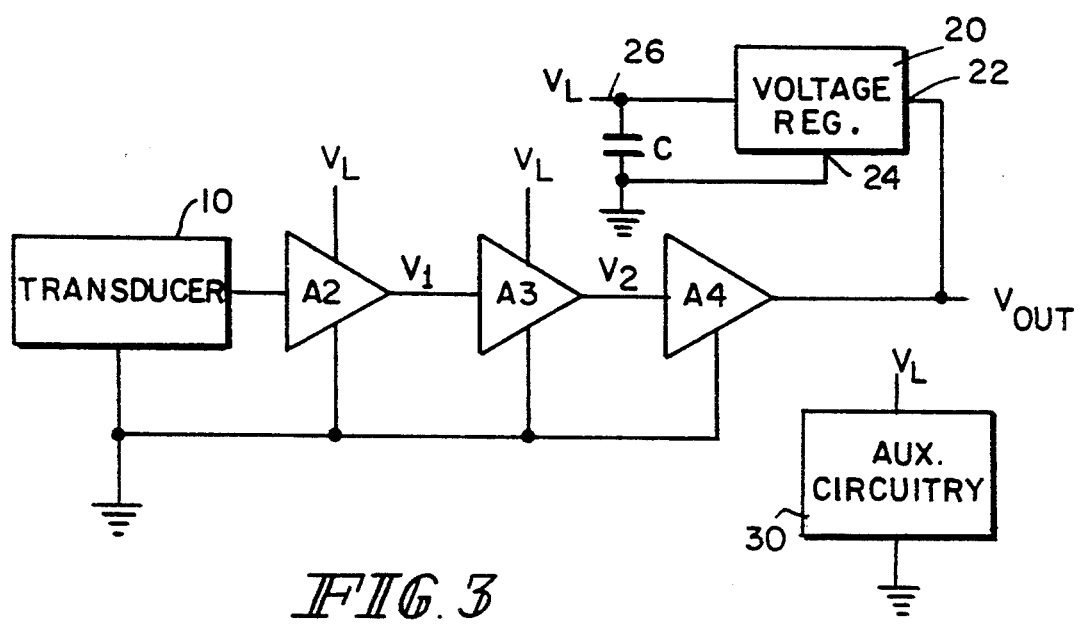
FIG. 3 is a block diagram of a transducer module according to the present invention.

One embodiment of the transducer module of the present invention is illustrated in FIG. 3 as including the transducer 10 connected to a first amplifier stage A2, whose output is V1 is connected to a second amplifying stage A3, whose output is V2 is connected to an output driver or amplifier A4. A voltage regulator 20 is also connected at 22 to the output of the module and produces a regulated voltage level VL at 26 across the capacitor C. The output stage A4 is self biasing from the output whereas the intermediate stages A2 and A3, as well as an auxiliary circuit 12, are biased from the regulated voltage VL. The voltage regulator 20 uses the unused power, that is normally sunk by the output driver A4, to power the additional stages A2, A3 and auxiliary circuits. Thus, the auxiliary stages and auxiliary circuits power requirements are transparent to the module output.

Figure 1:
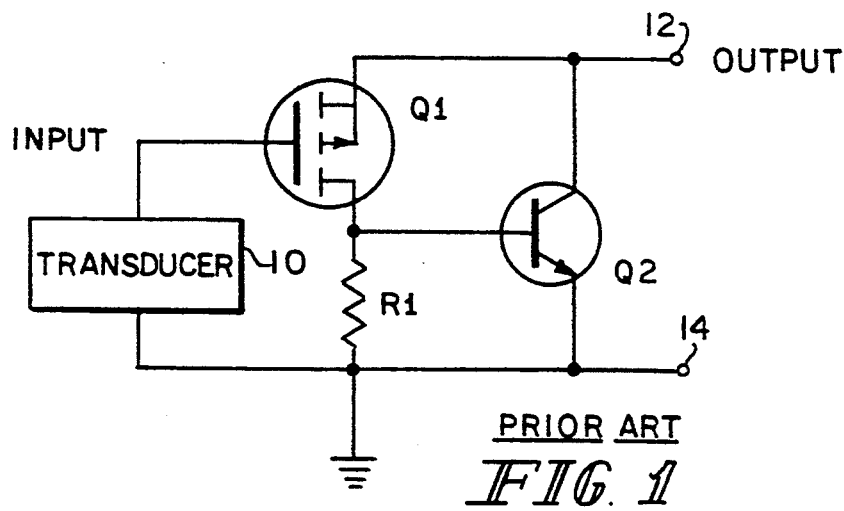
FIGS. 1 and 2 are schematics of two wire transducers of the prior art.
Figure 2:
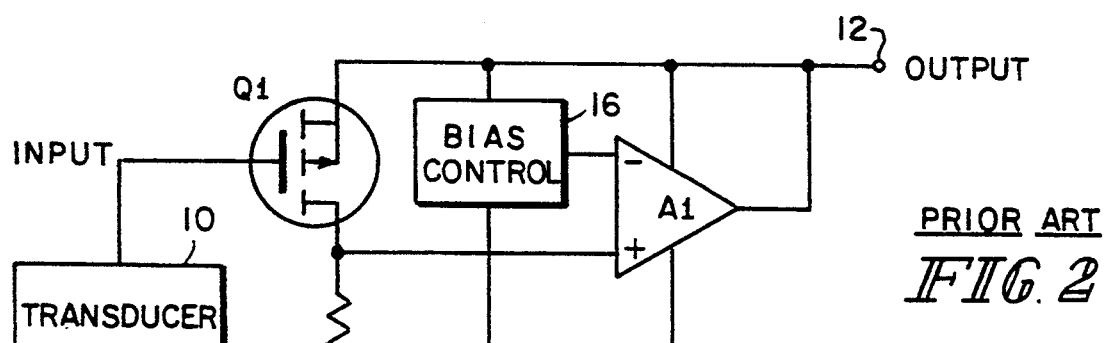

As a typical example, stage A2 is an impedance converter which shifts the DC signal from the transducer 10 to V1 which is approximately midpoint between the regulated voltage VL and ground for maximum signal swing. Stage A2 may include the transistor Q1 and R1 from FIGS. 1 and 2 which would have a voltage swing limited by the threshold voltage of Q1, which is generally in the three volt range. Additional stages would be necessary to level shift the three volts to increase the voltage swing for the output. The second stage A3 may be an operational amplifier or a stage for additional gain, active filtering and other complex processing having an output V2. The output buffer stage A4 has an input of V2 which is composed of AC+DC voltages. The DC voltage is the same as the DC voltage at V1 and is level shifted to a nominal 11 volt output bias at the output terminal V out.

The output voltage must be greater than the inter stage voltages V1 and V2, since V1 and V2 are one-half of the regulated voltage VL and the regulated voltage VL is regulated from the output voltage V out. A typical example, of V1 and V2 would be three volts, and V out at slightly greater than 11 volts. With a voltage swing of five volts negative, there would still be slightly greater than six volts left for the appropriate regulated voltage VL. VL is generally six volts which satisfies the constraint of V1 and V2 being one half of VL. The excess voltage between VL and the minimum at V out is needed by the voltage regulator for proper operation.

The voltage regulator 20 generally requires between 50 to 100 millivolts across its input and output terminals to properly regulate. The voltage regulator 20 may be a discrete or integrated voltage regulator, for example, a zener diode, an emitter follower, or a three terminal voltage regulator. The preferred embodiment consist of a low current shunt regulator using a PNP transistor for low dropout voltage. The amount of the four milliamp current which may be used by the additional stages and auxiliary circuitry is limited by four milliamps minus the total current required by the transducer 10 if any and the current required by the output stage A4 and its level shifter, under its worst case condition. Any current not required by the additional stages, the auxiliary circuit and the transducer and its output circuit will be sunk by the output stage A4 including an operational amplifier.

One example of an auxiliary circuit 30 is a self-testing circuit which tests the transducer upon power-up and has no effect during normal operation.

Figure 4:
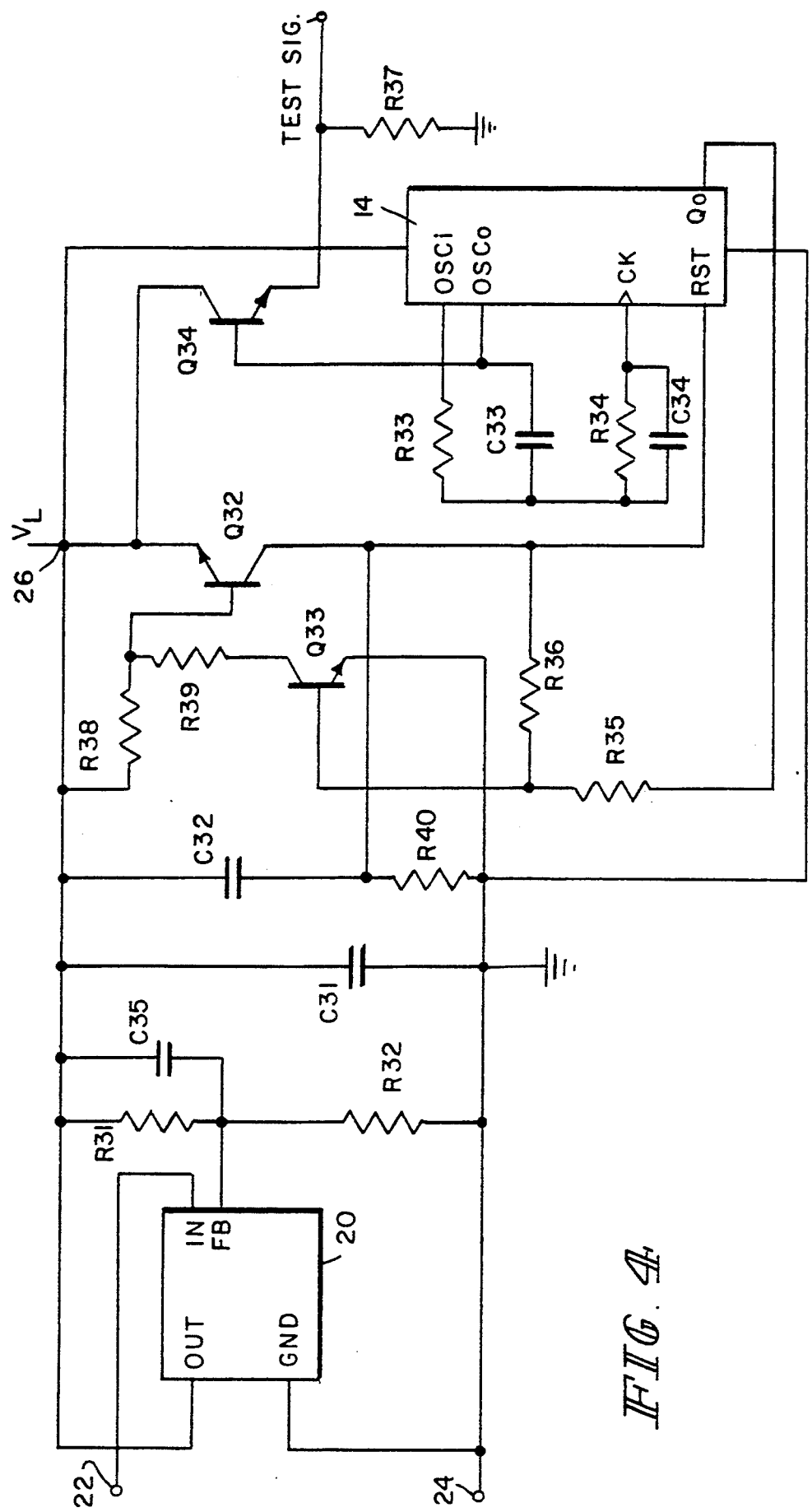
FIG. 4 is a detailed schematic of a self-testing auxiliary circuit according to one embodiment of the principles of the present invention.

As illustrated in FIG. 4, an integrated voltage regulator 20, for example, an LP2951, from National Semiconductor, has an input connected to the terminal 22 and a ground terminal connected to the ground terminal 24. Terminal 22 is connected to V out, the output terminal of the transducer. A voltage divider including resistors R31 and R32 and capacitor C35 is connected to provide a feedback signal to the regulator 20 from the output of the voltage regulator 20 to a feedback terminal FB. Depending on the values chosen, the regulated voltage VL would be approximately 3 volts. This regulated voltage at the output terminal 26 is stored by capacitor C31. The ground terminal 24 and the regulated voltage supply 26 are connected to an oscillator/counter circuit 14. An example of the combined oscillator and counter 14 would be a MC4060 from Motorola.

Capacitor C32 and resistor R40 provide a reset pulse at power-up to the reset terminal RST of the counter 14 such that it is cleared at the beginning or during power-up.

The output OSCo of the oscillator portion of circuit 14 is connected through capacitor C33 and resistors R33 and R34 to the oscillator input OSCi and to the clock input CK of the counter. The capacitor C33 and resistor R33 set the period of oscillation.

The output of the oscillator OSCo is connected to an output buffer driver Q34, which is illustrated as an NPN transistor. The purpose of the buffer driver is to isolate the oscillator from the effects of output loading. A selected output $Q_0$ of the counter, which provides a time-out signal, is connected through resistor R35 to the base of transistor Q33. Both transistor Q33, an NPN type and Transistor Q32, a PNP type and the resistors R38 and R39 are connected in such a fashion as to latch up through regenerative feedback. This action, much like that of an SCR, and may be replaced by an SCR, is effected by a portion of the collector current of Q32 flowing through resistor R36 into the base of transistor Q33. The current amplification properties of Q33 and Q32 result in collector current in Q33 which flows in part from the base of transistor Q32 which induces more collector current in Q33 until both transistors are saturated. Once the transistors Q32 and Q33 are latched in response to the time-out signal from $Q_0$, they will force the reset port RST high and stop the oscillator. The transistors Q32 and Q33 remain on until the current is interrupted by a power-down.

Figure 3A:
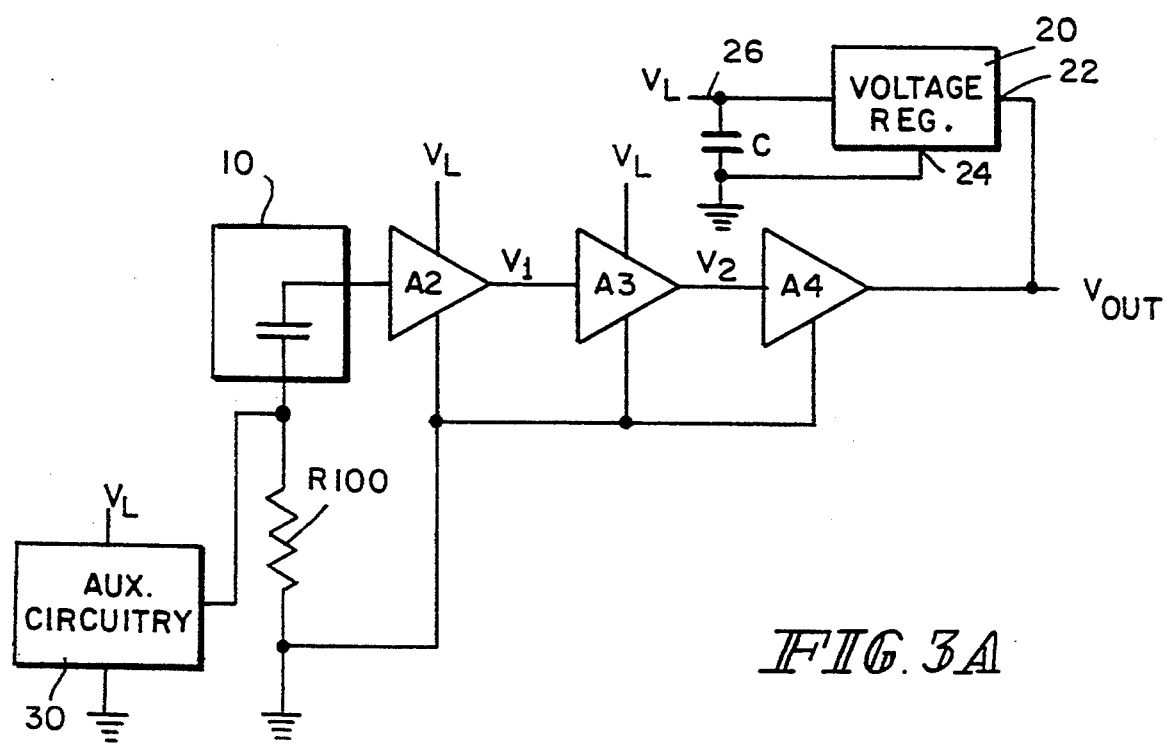
FIG. 3A is a modification of FIG. 3 for one embodiment of a testing connection.

A test signal present at the emitter of Q34 and R37 may be applied, for example, to the ground terminal or ground terminals of one or more piezoelectric elements wherein the other terminal of the piezoelectric element is connected to the signal processing circuitry of amplifiers A2, A3 and A4. This ground terminal may be a special arrangement depending on the exact sensing element employed, for example, a 100 Ohm resistor between the sensing element ground and the signal amplifier ground, shown as resistor R100 in FIG. 3A. This value resistance is sufficient to develop a potential between the ground terminal of the amplifier and the ground terminal of the piezoelectric sensing element. This potential, applied to the capacitance of the piezoelectric sensing element, causes a charge to be injected into the amplifier A2. Since A2 is, in this application, a charge sensitive amplifier, an output signal will result. Because the output signal is proportional to input charge, the charge is dependent on the physical properties of the piezoelectric sensing element, and the test signal voltage is fixed, any changes in the properties of the sensing element are sensed as changes in the test signal output amplitude. The 100 Ohm typical resistance used to isolate the ground terminals of the sensing element and sensitive amplifier A2 is much smaller than the high input impedance of A2 which is typically greater than 10 Gigaohms (10E9). As a consequence, under normal operating conditions without the test signal present, the effects of this 100 ohm resistor are negligible.

FIG. 4 is just one example of specific embodiments of the self-testing circuit which provides test signals to the transducer in response to power-up for a specific period and then shuts itself off. The ability to provide the self-testing circuit is but one example of an auxiliary circuit taking advantage of the available power at the transducer module without affecting the quality or signal processing of the signal available from the transducer. Other auxiliary circuits may include module identification circuits for example microprocessors and logic arrays providing identification signals. These identification signals would include one or more of the following: a serial number, lot number, date code, sensitivity data or setup instructions with the ancillary signal processing equipment. Bidirectional communication with the ancillary signal processing equipment and thus the transducer is possible. This would allow programming and thus customizing of the transducer electronically. As discussed previously, the voltage regulator is but one kind of power converting source which may be used. Current sources may also be used, since there is a relatively substantial amount of current which is sunk by the output driver or buffer A4 and may be available for other additional stages or auxiliary circuits.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A self-testing transducer circuit comprising:
   transducer means for electrically sensing a physical parameter;

driver means having an input connected to said transducer means and an output connected to a circuit output;

testing means responsive to power-up of said transducer circuit for applying test signals to said transducer means for a predetermined period; and said self-testing transducer circuit is in a single transducer module.

2. A self-testing circuit according to claim 1 wherein said testing means includes:

oscillator means for generating test signals in response to said power-up; and disable means for disabling said oscillator means after said predetermined period.

3. A self-testing circuit according to claim 2 wherein said disable means includes timing means for generating a time-out signal after said predetermined period and reset means for maintaining said oscillator means disabled in response to said time-out signal until a subsequent power-down.

4. A self-testing circuit according to claim 3 wherein said timing means includes a counter means for counting said test signals and generating said time-out signal after said predetermined period.

5. A self-testing circuit according to claim 4 wherein said timing means includes means for initializing said counter means at power-up.

6. A self-testing circuit according to claim 3 wherein said reset means a includes latch which is activated by said time-out signal to maintain said oscillator means disabled and is deactivated by a power-down.

7. A self-testing circuit according to claim 2 wherein said oscillator means includes a reset port and said disable means provides a reset signal on said reset port until a subsequent power-down.

8. A self-testing circuit according to claim 1 wherein said driver means and said testing means are powered by signals on said circuit output.

9. A self-testing circuit according to claim 8 wherein a voltage required for said testing means is less than a lowest circuit output signal as controlled by said driver means.

10. A self-testing circuit according to claim 1 wherein said driver means includes an impedance converter connected to said transducer means and an operational amplifier connecting said impedance converter to said circuit output.

11. A self-testing circuit according to claim 1 wherein said transducer means is a piezoelectric transducer having an output terminal and a reference terminal; and said testing means applies said test signals to said reference terminal.

12. A transducer module comprising:

transducer means for electrically sensing a physical parameter;

driver means having an input connected to said transducer means and an output connected to a module output for varying a signal on said module output in response to said transducer means;

auxiliary means connected to said module output for performing additional functions in said transducer module;

said driver means and said auxiliary means being powered by the signal on said module output; and said auxiliary means being capable of operating at a lowest module output signal as controlled by said driver means.

13. A transducer module according to claim 12 wherein power requirements of said auxiliary means are transparent to said module output.

14. A transducer module according to claim 12 wherein said driver means includes an operational amplifier; and said auxiliary means is connected to an output of said operational amplifier and is powered by sinking current at said operational amplifier's output.

15. A transducer module comprising:

output means for receiving power for said transducer module and sending output signals;

transducer means for electrically sensing a physical parameter;

driver means, having an input connected to said transducer means and an output connected to said output means and being powered from said output means, for varying said output signal on a module output in response to said transducer means;

auxiliary means for performing additional functions in said transducer module; and regulator means, connected to said output means and said auxiliary means for providing regulated power for said auxiliary means from said output means.

16. A transducer module according to claim 15 wherein said output means includes a pair of terminals for a two wire transducer system.

17. A transducer module according to claim 15 wherein said auxiliary means includes at least one signal processing means connected between said transducer means and said driver means.

18. A transducer module according to claim 15 wherein said auxiliary means includes, connected between said transducer means and said driver means, an impedance converter means and a gain means.

19. A transducer module according to claim 15 wherein the voltage required for said regulator means is less than a lowest circuit output signal as controlled by said driver means.

20. A transducer module according to claim 15 wherein said auxiliary means includes a microprocessor or logic array for providing an identification signal.

21. A transducer module according to claim 20 wherein said identification signal includes one or more of a serial number, lot number, date code, sensitivity data or setup instructions with ancillary signal processing equipment.

22. A self-testing transducer circuit comprising:

transducer means for electrically sensing a physical parameter;

driver means having an input connected to said transducer means and an output connected to a circuit output;

testing means for applying test signals to said transducer means for a predetermined period; and said driver means and said testing means are powered by signals on said circuit output.

23. A self-testing transducer circuit comprising:

transducer means for electrically sensing a physical parameter;

driver means having an input connected to said transducer means and an output connected to a circuit output;

testing means for applying test signals to said transducer means for a predetermined period; and a voltage required for said testing means being less than a lowest circuit output signal as controlled by said driver means.

24. A transducer module comprising:

transducer means for electrically sensing a physical parameter;

driver means having an input connected to said transducer means and an output connected to a module output for varying a signal on said module output in response to said transducer means;

auxiliary means connected to said module output for performing additional functions in said transducer module; and said driver means and said auxiliary means being powered by the signal on said module output.

25. A transducer module comprising:

transducer means for electrically sensing a physical parameter;

driver means having an input connected to said transducer means and an output connected to a module output for varying a signal on said module output in response to said transducer means;

auxiliary means connected to said module output for performing additional functions in said transducer module; and said auxiliary means being capable of operating at a lowest module output signal as controlled by said driver means.

26. A transducer module comprising:

transducer means including first and second terminal for electrically sensing a physical parameter;

driver means having an input connected to said first terminal of said transducer means, an output connected to a module output for varying a signal on said module output in response to said transducer means and a terminal connected to a module ground;

a resistance connecting said second terminal of said transducer means to said ground; and a test signal terminal connected to said second terminal of said transducer means between said second terminal and said resistance.

* * * * *